United States Patent
Inaba et al.

(10) Patent No.: US 6,928,820 B2
(45) Date of Patent: Aug. 16, 2005

(54) WASTE HEAT COLLECTING SYSTEM HAVING RANKINE CYCLE AND HEATING CYCLE

(75) Inventors: Atsushi Inaba, Kariya (JP); Shinichi Hamada, Anjo (JP); Shigeru Hisanaga, Kariya (JP); Tadashi Hotta, Okazaki (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 10/993,541

(22) Filed: Nov. 19, 2004

(65) Prior Publication Data
US 2005/0109031 A1  May 26, 2005

(30) Foreign Application Priority Data
Nov. 20, 2003 (JP) .............................. 2003-390893

(51) Int. Cl.[7] .............................................. F01K 23/10
(52) U.S. Cl. ......................................... 60/618; 60/670
(58) Field of Search ........................... 60/614, 616, 618, 60/670

(56) References Cited

U.S. PATENT DOCUMENTS

| 4,238,931 A | * | 12/1980 | Campbell ..................... 62/183 |
| 5,632,143 A | * | 5/1997 | Fisher et al. ............. 60/39.182 |
| 2003/0110773 A1 | * | 6/2003 | Rouse et al. .................. 60/670 |
| 2004/0050052 A1 | | 3/2004 | Niikura et al. |
| 2004/0216483 A1 | | 11/2004 | Inaba et al. |

FOREIGN PATENT DOCUMENTS

| JP | 1-024646 | 5/1989 |
| JP | 63-96449 | 7/1996 |

* cited by examiner

*Primary Examiner*—Hoang Nguyen
(74) *Attorney, Agent, or Firm*—Harness, Dickey & Pierce, PLC

(57) ABSTRACT

An object of the invention is to provide a rankine cycle suitable for a use for a motor vehicle. In a waste heat collecting system having the rankine cycle and a refrigerating cycle, when ECU receives an air-conditioning signal from A/C ECU, the refrigerating cycle is operated, by preceding the operation of the rankine cycle. In the case that there is no air-conditioning signal and a temperature of an engine cooling water is higher than a predetermined value, the rankine cycle is operated.

6 Claims, 4 Drawing Sheets

OPERATION AS A COMPRESSOR DEVICE

OPERATION AS AN EXPANSION DEVICE

WASTE HEAT COLLECTING SYSTEM HAVING RANKINE CYCLE AND HEATING CYCLE

CROSS REFERENCE TO RELATED APPLICATION

This application is based on Japanese Patent Application No. 2003-390893 filed on Nov. 20, 2003, the disclosures of which is incorporated herein by reference.

FIELD OF THE INVENTION

The present invention relates to a waste heat collecting system having a Rankine cycle for collecting heat energy from a thermal engine, in particular to a vapor compression type refrigerating apparatus (an air-conditioning apparatus) for a motor vehicle, wherein an internal combustion engine is used as the thermal engine.

BACKGROUND OF THE INVENTION

A Rankine cycle comprises a vapor generating device for generating a super heated vapor by heating a liquid-phase fluid, an expansion device for generating a kinetic energy by expanding the super heated vapor in an isenthropic manner, a condenser for liquidizing the vapor expanded at the expansion device, a liquid pump for supplying a liquid-phase fluid to the vapor generating device, and so on, as disclosed in Japanese Patent No. 1540256 or Japanese Patent Publication No.2002-188402.

In a prior art vapor compression type refrigerating apparatus (an air-conditioning apparatus for a motor vehicle) utilizing the Rankine cycle, as disclosed in Japanese Patent Publication No. S63-96449, a compressor device is also utilized as an expansion device.

In the above prior art vapor compression type refrigerating apparatus (JP S63-96449), a refrigerating cycle and the Rankine cycle can not be operated at the same time, because the compressor device is utilized as the expansion device.

Furthermore, it may be difficult to practically carry out the invention of the above prior art (JP S63-96449), because it is not fully disclosed how the refrigerating cycle and the Rankine cycle are switched over from one to the other and how the Rankine cycle is performed.

SUMMARY OF THE INVENTION

Accordingly, the present invention is made in view of the above problems. It is an object of the present invention to provide a new rankine cycle, and another object is to provide a new rankine cycle which is suitable for a use for a motor vehicle having a thermal engine, such as an internal combustion engine.

According to a feature of the present invention, a waste heat collecting system having a rankine cycle comprises: a vapor generating device for generating a superheated vapor by heating a liquid-phase fluid with a waste heat from a thermal engine; an expansion device for generating a kinetic energy by expanding the superheated vapor in an isenthropic manner; a condensing device for condensing the vapor expanded in the expansion device to convert the vapor into the liquid-phase fluid; a liquid pump for pumping the liquid-phase fluid to the vapor generating device; and an adjusting means for adjusting an amount of the waste heat to be supplied to the vapor generating device from the thermal engine, so that the supply of the superheated vapor from the vapor generating device to the expansion device is correspondingly controlled, wherein the adjusting means supplies the waste heat from the thermal engine to the vapor generating device when a temperature (Tw) of the waste heat is higher than a predetermined value, and stops the supply of the waste heat from the thermal engine to the vapor generating device when the temperature (Tw) of the waste heat is lower than the predetermined value.

According to this feature of the invention, a kinetic energy can be obtained from the waste heat from the thermal engine, without causing a decrease of a fuel consumption ratio for the engine, because an increase of friction resistance (friction loss) due to a decrease of a temperature of the thermal engine can be suppressed.

According to another feature of the present invention, the adjusting means starts the supply of the waste heat to the vapor generating device at a first predetermined value, which is higher than a second predetermined value at which the adjusting means stops the supply of the waste heat to the vapor generating device.

According to a further feature of the present invention, a temperature difference between the first and the second predetermined values is larger than 5 degrees and smaller than 10 degrees.

According to a further feature of the present invention, the adjusting means comprises a change-over means for starting or stopping the supply of the waste heat from the thermal engine to the vapor generating device, an operation of which is controlled by an electronic control unit.

According to a further feature of the present invention, a waste heat collecting system further comprises; a vapor compression type refrigerating cycle for absorbing heat from a refrigerating fluid by expanding the same; an A/C control unit for controlling an operation of the refrigerating cycle; and a control means for changing over from the operation of the rankine cycle to the operation of the refrigerating cycle, or vice versa, wherein the control means operates the refrigerating cycle when it receives a control signal from the A/C control unit, without operating the rankine cycle.

Accordingly, a kinetic energy can be obtained from the waste heat from the thermal engine, without causing a decrease of a fuel consumption ratio for the engine, because an increase of friction resistance (friction loss) due to a decrease of a temperature of the thermal engine can be suppressed. And in addition, the refrigerating cycle can be operated.

In the above operation of the refrigerating cycle, the expansion device is operated as a compressor device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
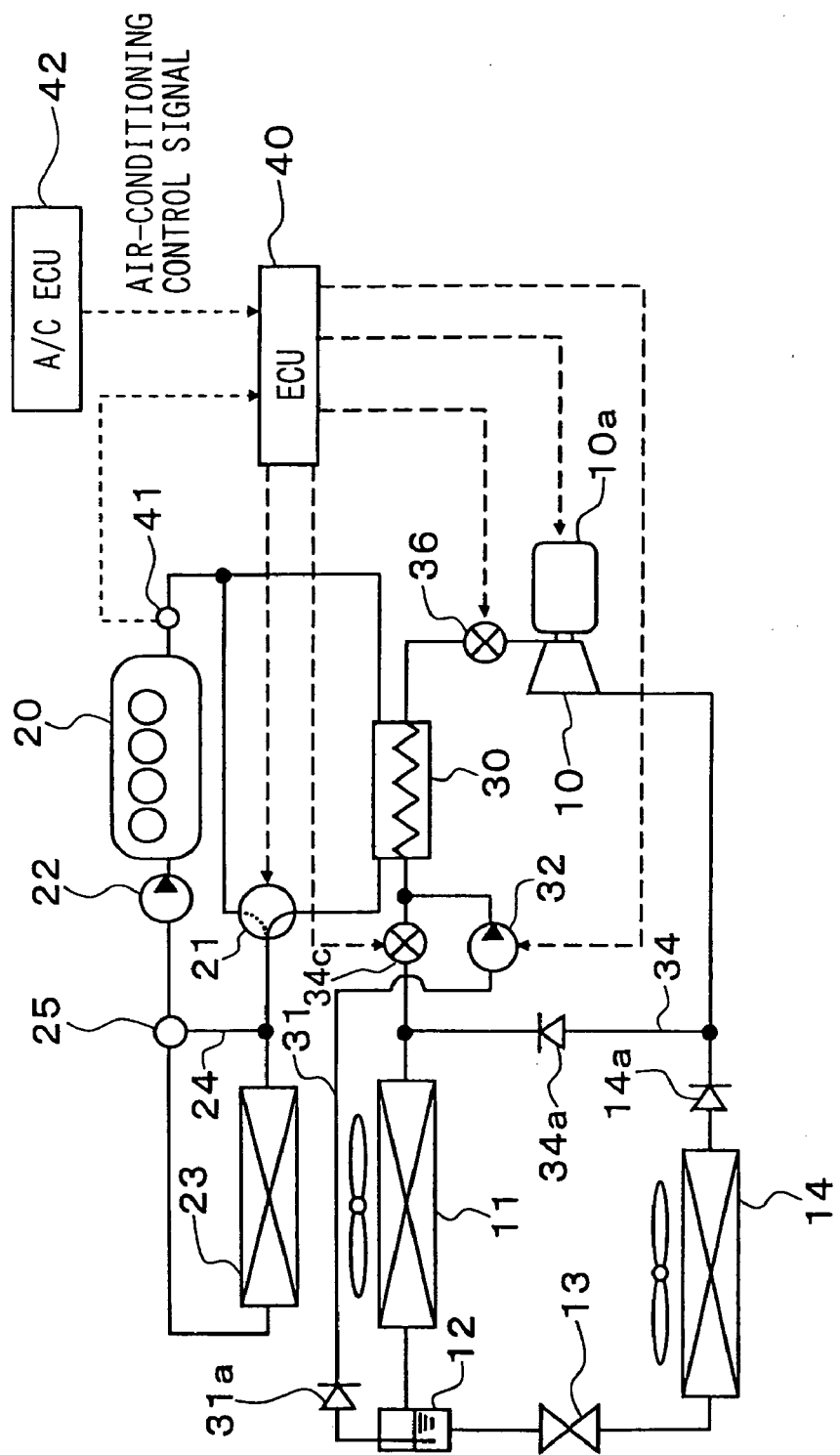
FIG. 1 is a schematic diagram showing a vapor compression type refrigerating cycle according to a first embodiment of the present invention.

FIG. 1 is a schematic diagram showing a vapor compression type refrigerating apparatus according to a first embodiment of the present invention, in which a refrigerating cycle having a rankine cycle is used for an air-conditioning apparatus for a motor vehicle.

The vapor compression type refrigerating apparatus having the rankine cycle collects an energy from a waste heat form an internal combustion engine for generating a driving force for a vehicle, wherein the internal combustion engine is operating as a thermal engine. The refrigerating apparatus makes use of thermal energy generated thereat for performing an air-conditioning operation for the vehicle.

In FIG. 1, a compressor device 10 integrally formed with an expansion device is a fluid machine having a function of a compressor for compressing a refrigerant and a function of an expander for generating a driving force by expanding a superheated vapor in an isenthropic manner.

A reference numeral 10a designates an electric rotating machine (a motor-generator), which operates as an electric motor for generating and supplying a rotational driving force to the fluid machine 10 when it is to be operated as a compressor device, and which operates as an electric power generating machine for generating an electric power from a rotational force generated at the fluid machine 10 when it is operated as an expanding device. More detailed structure of the fluid machine 10 will be explained later.

A heat radiating device 11 is a heat exchanger (condenser) connected to the fluid machine 10 at its discharge side when the fluid machine 10 operates as the compressor device, and cools down (condenses) a refrigerant by radiating the heat from the refrigerant. As shown in FIG. 1, a control valve 34c, a heating device 30 and another control valve 36 is connected between the heat radiating device 11 and the fluid machine 10. A gas-liquid dividing device 12 is a receiver for dividing the refrigerant from the heat radiating device 11 into a gas-phase and a liquid-phase refrigerant.

A depressurizing device 13 is an expansion valve for depressurizing and expanding the liquid-phase refrigerant from the gas-liquid dividing device 12. In this embodiment, the depressurizing device 13 depressurizes the refrigerant in the isenthalpic manner and comprises an expansion valve of a temperature dependent type to control an opening degree thereof, so that a degree of super heat for the refrigerant to be sucked into the fluid machine 10 (the compressor device) may not exceed a predetermined value, when the fluid machine 10 is operated as the compressor device.

An evaporator 14 is a heat absorbing device for performing a heat absorbing function by evaporating the refrigerant depressurized at the depressurizing device 13.

A vapor compression type refrigerating cycle is constituted by the fluid machine 10 (expansion and compressor device), the heat radiating device 11, the gas-liquid dividing device 12, the depressurizing device 13 and the evaporator 14, wherein heat is transferred from a low temperature side to a high temperature side.

A heating device 30 is a vapor generating device provided in a refrigerant circuit connecting the fluid machine 10 and the heat radiating device 11, and generates a vapor by heating the refrigerant flowing in the refrigerant circuit, through a heat exchange between the refrigerant and engine cooling water collecting a waste heat from an internal combustion engine 20. A three way valve 21 is a changeover means for controlling the flow of the engine cooling water into the heating device 30.

A first bypass circuit 31 is a refrigerant passage for connecting the gas-liquid dividing device 12 with the heating device 30, wherein a liquid pump 32 and a check valve 31a are provided in the first bypass circuit 31, so that the refrigerant may be circulated from the gas-liquid dividing device 12 to the heating device 30 through the check valve 31a when the liquid pump 32 is operating. In this embodiment, a liquid-phase refrigerant supplying means is constituted by the first bypass circuit 31, the check valve 31a and the liquid pump 32.

The liquid pump 32 is an electrically driven pump. An operation of the liquid pump 32 as well as the three way valve 21 is controlled by an electronic control unit (ECU) 40.

A second bypass circuit 34 is a refrigerant passage for connecting the discharge side of the fluid machine 10 (the expansion device) with an inlet side of the heat radiating device 11, when the fluid machine 10 is operated as the expansion device, wherein a check valve 34a is provided in the second bypass circuit 34, so that the refrigerant may flow from the expansion device 10 to the heat radiating device 11.

A check valve 14a is provided in a refrigerant passage connecting the evaporator 14 and the fluid machine 10, so that the refrigerant may flow from the evaporator 14 to the fluid machine 10, when it is operating as the compressor device.

A control valve 36 is provided in a refrigerant passage connecting the fluid machine 10 and the heating device 30, wherein the control valve 36 is, for example, an electromagnetically controlled valve to be controlled by the ECU 40. The control valve 36 operates as a discharge valve (a check valve) when the fluid machine 10 is operating as the compressor device, while it operates as a normally-opened valve when the fluid machine 10 is operating as the expansion device.

A water pump 22 circulates the engine cooling water, and a radiator 23 is a heat exchanger for radiating heat from the engine cooling water through heat exchange with the ambient air.

A bypass passage 24 is a passage for flowing the engine cooling water so that it bypasses the radiator 23. A thermostat 25 is a flow control valve for controlling amounts of the engine cooling water respectively flowing through the radiator 23 and the bypass passage 24.

The water pump 22 is a mechanical type pump driven by the engine 20 in this embodiment. It can be, however, replaced by an electrically driven type pump which is driven by an electric motor.

A water temperature sensor 41 detects a temperature of the engine cooling water and a detected signal is supplied to the ECU 40. An air-conditioning control signal is generated at an A/C control unit 42 and supplied to the ECU 40. The ECU 40 performs a control process in accordance with a predetermined program based on the detected temperature at the water temperature sensor 41 (that is a temperature Tw of waste heat) and the air-conditioning control signal, in order that the ECU 40 controls the control valve 36, the liquid pump 32, the three way valve 21 and so on.

In this embodiment, the three way valve 21 and the ECU 40 for controlling the three way valve 21 constitute an adjusting means for a waste heat supplying amount, the A/C control unit 42 constitutes a control means for the vapor compression type refrigerating apparatus, and the fluid machine 10, the heat radiating device 11, the gas-liquid dividing device 12, the liquid pump 32 constitute the rankine cycle.

A rough structure and an operation of the fluid machine 10 will be explained.

Figure 2A:
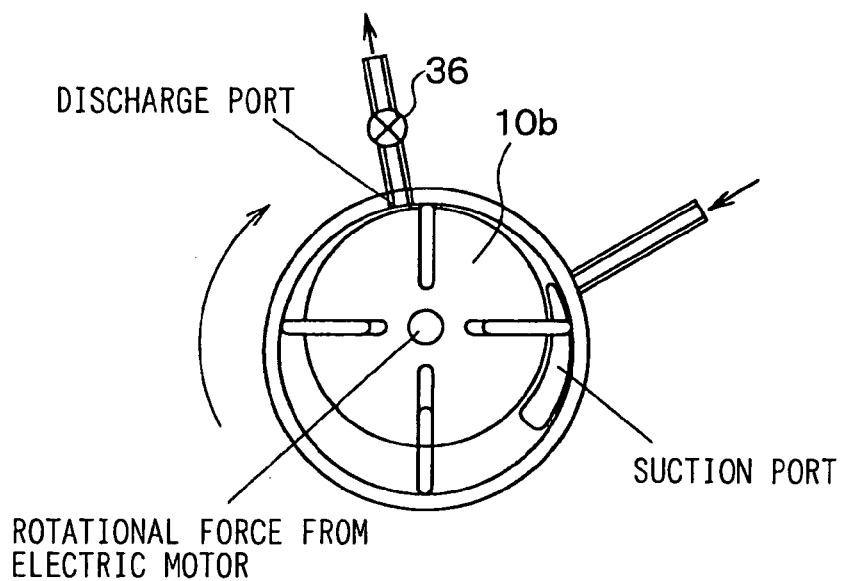
FIGS. 2A and 2B are schematic views of a fluid machine (an expansion device and a compressor device are integrally formed) according to the first embodiment of the present invention.
Figure 2B:
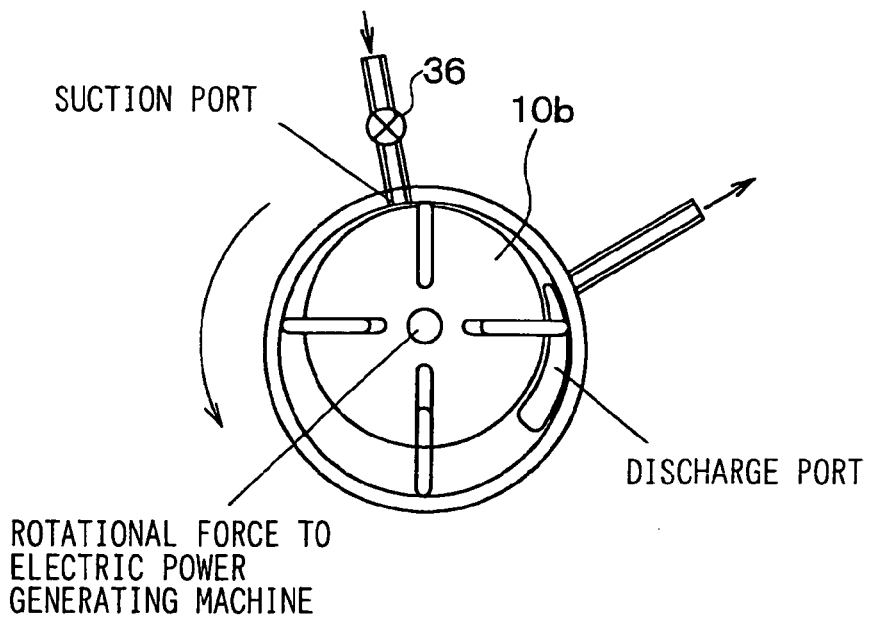

FIG. 2A shows the fluid machine 10 when it is operating as the compressor device, whereas FIG. 2B shows the fluid machine 10 when it is operating as the expansion device, wherein the fluid machine 10 comprises a well known vane-type fluid machine.

When the fluid machine 10 is operating as the compressor device, a rotor 10b of the fluid machine is driven to rotate by the electric rotating machine 10a (operating as the electric motor) to suck the refrigerant and to compress the same. In this operation, a reverse flow of the refrigerant, namely a flow of high pressure refrigerant back to working chambers of the compressor device 10, is prevented by the control valve 36.

When the fluid machine 10 is operating as the expansion device, the control valve 36 is opened to introduce the super heated vapor (refrigerant) generated at the heating device 30 into the working chambers of the expansion device 10, so that the rotor 10b is rotated to convert the heat energy into kinetic energy.

An operation of the vapor compression type refrigerating apparatus having the rankine cycle according to the embodiment will be explained.

The apparatus according to the embodiment has an air-conditioning operation mode and a waste heat collecting operation mode depending on the air-conditioning control signal and the temperature Tw of the waste heat.

(1. Air-Conditioning Operation Mode)

In this operation mode, the evaporator 14 performs a heat absorbing operation, while the heat radiating device 11 performs a heat radiating operation.

To this end, the operation of the liquid pump 32 is stopped, the control valve 34c is opened, and the control valve 36 is operated as the check valve, so that the refrigerant may flow from the fluid machine 10 to the heat radiating device 11. Then, the electric power is supplied to the electric rotating machine 10a to operate it as the electric motor, so that the rotor 10b is driven to rotate by the electric motor 10a in a direction indicated by an arrow in FIG. 2A. In this operation mode, the engine cooling water is controlled by the three way valve 21 to bypass the heating device 30, as indicated by a dotted line at the three way valve 21 in FIG. 1.

The refrigerant compressed by the fluid machine 10 (operating as the compressor device) flows to the heating device 30 and circulates through the heat radiating device 11, the gas-liquid dividing device 12, the depressurizing device 13, the evaporator 14 and then back to the compressor device 10. As described above, the engine cooling water does not flow through the heating device 30 in this operation mode, and thereby the heating device 30 performs a simple fluid passage for the refrigerant.

The refrigerant depressurized at the depressurizing device 13 is evaporated at the evaporator 14 by absorbing heat from the ambient air, which will be then blown into a passenger compartment of the vehicle. The refrigerant transferred into the gas-phase refrigerant by the evaporation is sucked into the compressor device 10, so that the refrigerant is compressed to a high-pressure and high-temperature refrigerant.

The high-temperature refrigerant is then cooled down by the heat radiating device 11 to condense the refrigerant.

In the above embodiment, Freon gas (HFC134a) or any other refrigerating fluid can be used. Furthermore, although the above operation is explained for the cooling operation or dehumidifying operation, the refrigerating cycle can be operated in the same manner for a heating operation.

(2. Waste Heat Collecting Operation Mode)

In this operation mode, the operation of the fluid machine 10 as the compressor device is stopped, and instead it is operated as the expansion device to collect the waste heat from the engine 20 and to obtain kinetic energy.

In this operation, the control valve 34c is closed, the control valve 36 is opened, the liquid pump 32 is operated, and the passage of the three way valve 21 is changed over from the dotted line to a solid line as indicated in FIG. 1, so that the engine cooling water from the engine 20 circulates through the heating device 30.

In this operation, the refrigerant flows from the gas-liquid dividing device 12 to the heating device 30 through the first bypass circuit 31 and the liquid pump 32, and circulates back to the gas-liquid dividing device 12 through the fluid machine 10 (operating as the expansion device), the second bypass circuit 34 and the heat radiating device 11.

Accordingly, the superheated vapor of the refrigerant heated at the heating device 30 flows into the expansion device 10, wherein the superheated vapor is expanded in the expansion device in the isenthropic manner to decrease its enthalpy. As a result, the expansion device 10 is rotated in a direction indicated by an arrow in FIG. 2B to generate kinetic energy corresponding to a decreased amount of the enthalpy, which is applied to the electric rotating machine 10a operating as the electric power generator. The electric power generated at the electric rotating machine 10a is then charged into a battery or any other energy storing means.

The refrigerant coming out from the expansion device 10 is cooled down and condensed at the heat radiating device 11, and stored in the gas-liquid dividing device 12. The liquid-phase refrigerant is pumped out by the liquid pump 32 from the gas-liquid dividing device 12 to the heating device 30.

The liquid pump 32 pumps out the refrigerant at such a pressure, that the superheated refrigerant at the heating device 30 may not flow back in a reversed direction from the heating device 30 to the gas-liquid dividing device 12.

As in the above waste heat collecting operation, the waste heat from the engine 20 can be collected and converted into the electric energy, which can be re-used for the operation of the vehicle. As a result, a fuel consumption ratio of the engine 20 can be improved.

Furthermore, since the electric power is generated from the waste heat from the engine 20 in the waste heat collecting operation, a necessary driving power for an electric power generating machine (an alternator) for the vehicle can be reduced, so that the fuel consumption ratio can be further improved.

In the operation of the above embodiment, when the A/C control signal is applied from the A/C ECU 42 to the ECU 40, the air-conditioning operation precedes the waste heat collecting operation, so that the fluid machine 10 is operated as the compressor device and the supply of the engine cooling water into the heating device 30 is stopped.

In the case that the A/C control signal is not applied from the A/C ECU 42 to the ECU 40, and the temperature Tw of the waste heat exceeds a predetermined value, the waste heat collecting operation is performed by supplying the engine cooling water to the heating device 30 and operating the fluid machine 10 as the expansion device.

On the other hand, in the case that the A/C control signal is not applied from the A/C ECU 42 to the ECU 40, but the temperature Tw of the waste heat does not exceed the predetermined value, the engine cooling water is not supplied from the engine 20 to the heating device 30 and the electric power is not supplied to the electric rotating machine 10a, either.

Figure 3:
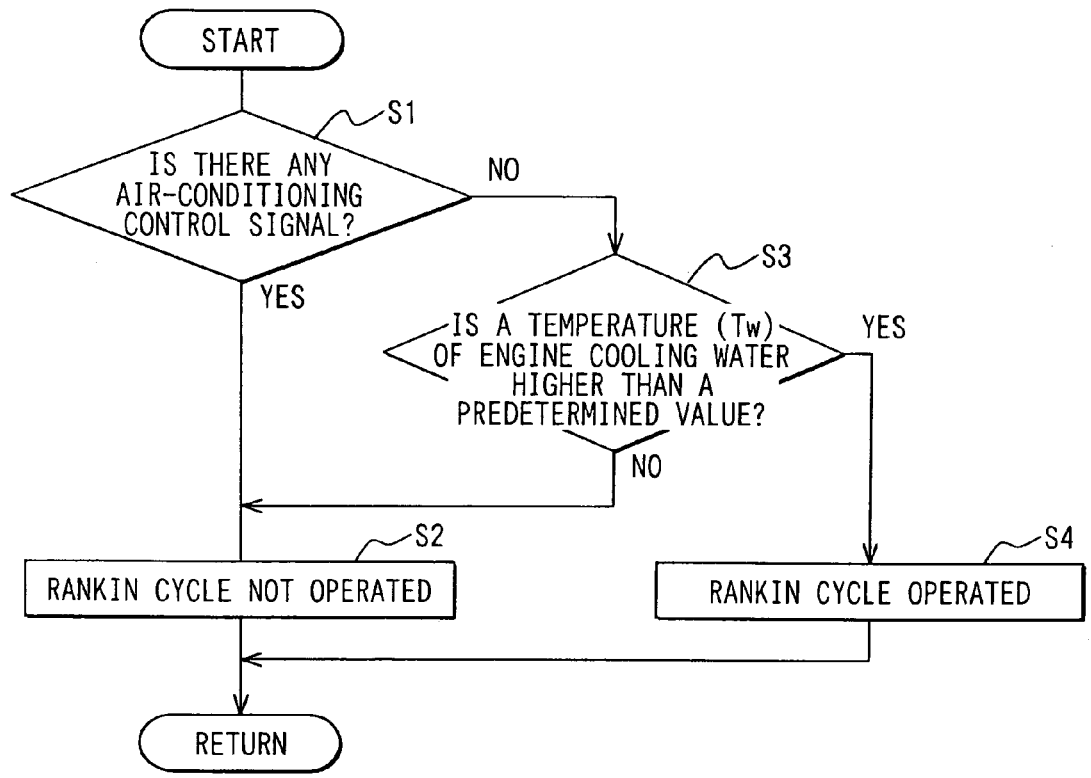
FIG. 3 is a chart showing an operation of the fluid machine according to the first embodiment.

FIG. 3 is a flow chart for controlling the above embodiment. When the engine operation is started, the ECU 40 determines at a step S1 whether there is the A/C control signal from the A/C ECU 42. In the case that the ECU 40 confirms the A/C control signal from the A/C ECU 42, the process goes to a step S2 at which the rankine cycle is not operated and the air-conditioning operation is performed.

In the case that the A/C control signal is not applied from the A/C ECU 42 to the ECU 40, the process goes from the step S1 to a step S3, at which the ECU 40 determines whether the temperature Tw of the waste heat exceeds the predetermined value. When it is determined at the step S3 that the temperature Tw exceeds the predetermined value, the process goes to a step S4, at which the operation of the rankine cycle is started so that waste heat collecting operation is performed.

Figure 4:
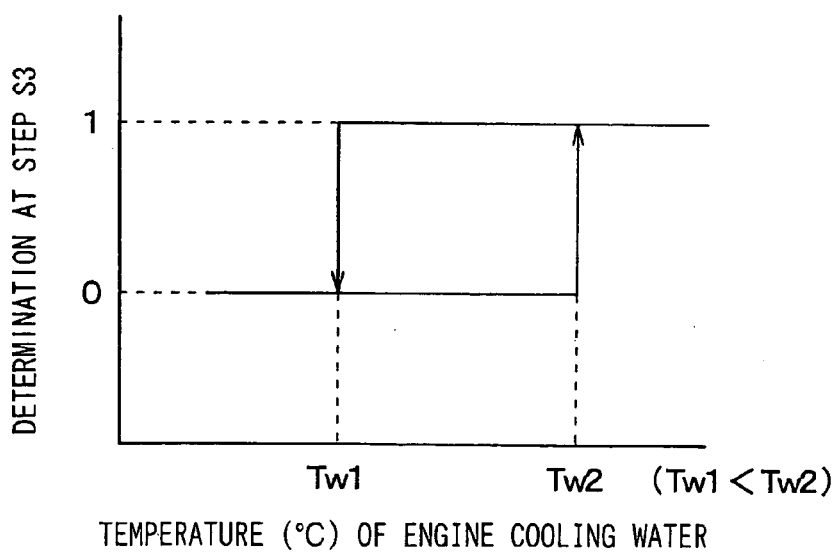
FIG. 4 is an explanation chart for a water temperature determination.

At the step S4, the temperature Tw of the waste heat is determined by comparing with the predetermined value having a hysteresis, as shown in FIG. 4. In the case that the temperature Tw of the waste heat (=the engine cooling water) is decreasing, it is determined by the ECU 40 that the temperature Tw exceeds the predetermined value, when the temperature Tw is higher than a value Tw1. On the other hand, in the case that the temperature Tw of the waste heat (=the engine cooling water) is increasing, it is determined by the ECU 40 that the temperature Tw exceeds the predetermined value, when the temperature Tw is higher than a value Tw2, which is higher than Tw1. In this embodiment, a temperature difference between the values of Tw1 and Tw2 is set at a value between 5 to 10 degrees.

When the temperature of the engine 20, i.e. the temperature of the engine cooling water, is low, the fuel consumption ratio is likely to become lower, because an oil viscosity becomes higher and thereby a friction loss in the engine 20 becomes larger.

And therefore, if the rankine cycle is operated when the temperature Tw of the waste heat is low, the temperature of the engine cooling water is further decreased to decrease the temperature of the engine 20.

According to the present invention, however, the rankine cycle is operated to collect the waste heat, when the temperature Tw of the engine cooling water is high (higher than Tw1 or Tw2) enough to collect the waste heat. As a result, the kinetic energy can be obtained from the waste heat from the engine 20, without causing a decrease of the fuel consumption ratio.

Second Embodiment

Figure 5:
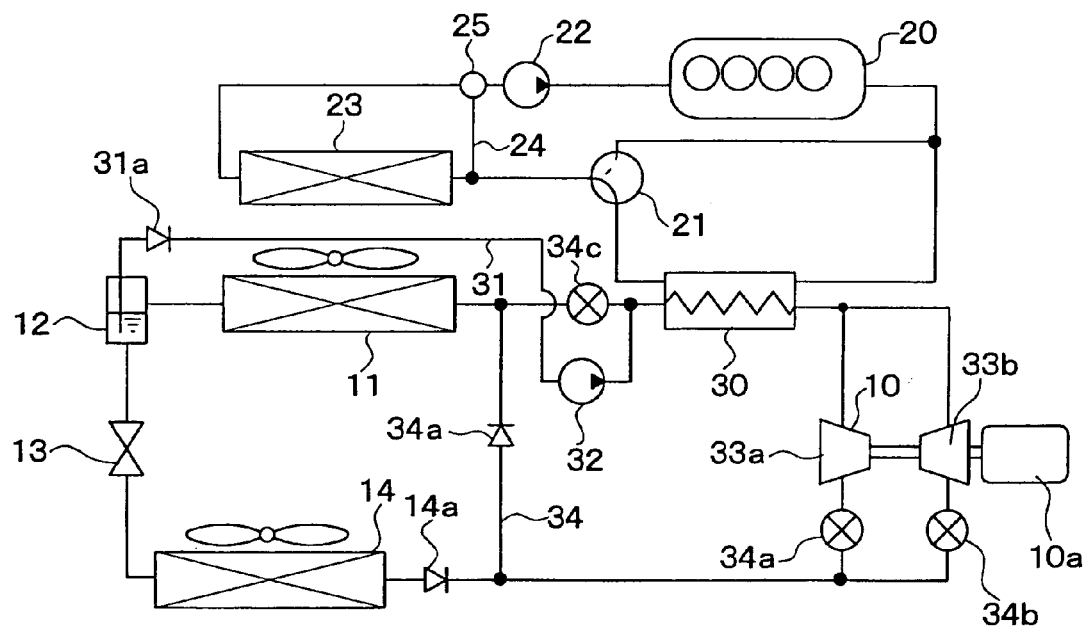
FIG. 5 is a schematic diagram showing a vapor compression type refrigerating cycle according to a second embodiment of the present invention.

In the above first embodiment, the fluid machine 10 comprises the compressor device integrally formed with the expansion device. In FIG. 5 showing a second embodiment, however, a compressor device 33a and an expansion device 33b are independently provided, wherein the compressor device 33a and the expansion device 33b are operatively connected with each other by a one-way clutch (not shown).

Control valves 34a and 34b are respectively connected to the compressor device 33a and the expansion device 33b, an opening and closing of which is controlled by the ECU 40. The control valve 34a is opened and the control valve 34b is closed for the air-conditioning operation, while the control valve 34a is closed and the control valve 34b is opened for the waste heat collecting operation.

Third Embodiment

In the above first embodiment, the three way valve 21 is changed over so that the engine cooling water may flow from the engine 20 through the heating device 30, during the waste heat collecting operation mode. The operation of the waste heat collection can be, however, modified in the following manner. The engine cooling water is kept flowing through the heating device 30, and the water pump 22 and/or the liquid pump 32 is controlled by the ECU 40 depending on the temperature of the engine cooling water, so that the waste heat collecting operation is performed when the temperature Tw of the waste heat exceeds a predetermined value.

Other Embodiments

The present invention shall not be limited to the embodiments described above and many other modifications can be possible.

For example, the kinetic energy generated at the expansion device can be stored as an energy of movement in a flywheel or as an elastic potential energy in a spring.

Other types of the fluid machine than the vane type can be used for the compressor device and the expansion device.

In the waste heat collecting operation, the hysteresis for the temperature determination may not be always necessary.

The present invention can be used for other purposed than the motor vehicle.

Any other device than the internal combustion engine can be used as the thermal engine.

What is claimed is:

1. A waste heat collecting system having a rankine cycle comprising:
   a vapor generating device for generating a superheated vapor by heating a liquid-phase fluid with a waste heat from a thermal engine;
   an expansion device for generating a kinetic energy by expanding the superheated vapor in an isenthropic manner;
   a condensing device for condensing the vapor expanded in the expansion device to convert the vapor into the liquid-phase fluid;
   a liquid pump for pumping the liquid-phase fluid to the vapor generating device; and
   an adjusting means for adjusting an amount of the waste heat to be supplied to the vapor generating device from the thermal engine, so that the supply of the superheated vapor from the vapor generating device to the expansion device is correspondingly controlled, wherein
   the adjusting means supplies the waste heat from the thermal engine to the vapor generating device when a temperature (Tw) of the waste heat is higher than a predetermined value, and stops the supply of the waste heat from the thermal engine to the vapor generating device when the temperature (Tw) of the waste heat is lower than the predetermined value.

2. A waste heat collecting system according to claim 1, wherein a first predetermined value at which the adjusting means starts the supply of the waste heat to the vapor generating device is higher than a second predetermined value at which the adjusting means stops the supply of the waste heat to the vapor generating device.

3. A waste heat collecting system according to claim 2, a temperature difference between the first and the second predetermined values is larger than 5 degrees and smaller than 10 degrees.

4. A waste heat collecting system according to claim 1, wherein the adjusting means comprises;

a change-over means for starting or stopping the supply of the waste heat from the thermal engine to the vapor generating device; and an electronic control unit for controlling an operation of the change-over means.

5. A waste heat collecting system according to claim 1, further comprising:

a vapor compression type refrigerating cycle for absorbing heat from a refrigerating fluid by expanding the same;

another electronic control unit for controlling an operation of the refrigerating cycle; and a control means for changing over from the operation of the rankine cycle to the operation of the refrigerating cycle, or vice versa, wherein the control means operates the refrigerating cycle when it receives a control signal from the other electronic control unit, without operating the rankine cycle.

6. A waste heat collecting system according to claim 5, wherein the expansion device is operated as a compressor device during the operation of the refrigerating cycle.

* * * * *